US006516362B1

(12) United States Patent
Magro et al.

(10) Patent No.: US 6,516,362 B1
(45) Date of Patent: Feb. 4, 2003

(54) SYNCHRONIZING DATA BETWEEN DIFFERING CLOCK DOMAINS

(75) Inventors: James R. Magro, Austin, TX (US); Michael S. Quimby, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/379,014

(22) Filed: Aug. 23, 1999

(51) Int. Cl.[7] .......................... G06F 13/00; G06F 13/16; G06F 1/12
(52) U.S. Cl. .......................... 710/58; 709/400; 713/400; 713/401; 713/500; 713/503
(58) Field of Search .......................... 710/58; 713/400, 713/401, 500, 503; 709/400

(56) References Cited

U.S. PATENT DOCUMENTS

| 4,791,404 A | * | 12/1988 | Hollister | ...................... 324/102 |
| 6,049,887 A | * | 4/2000 | Khandekar et al. | ......... 713/400 |
| 6,256,717 B1 | * | 7/2001 | Inoue et al. | ................. 711/157 |

OTHER PUBLICATIONS

*Enhanced Am 486® DX Microprocessor Family*, Advanced Micro Devices, Mar. 1997, pp. 1–3, 14–38.
*Am 486™ DX/DX2 Microprocessor Hardware Reference Manual*, Advanced Micro Devices, © 1993, pp. 5–1 through 5–6.
*AMD–K5™ Processor Data Sheet*, Advanced Micro Devices, Jan. 1997, pp. 14–36.
*Elan™SC400 and ElanSC410 Microcontrollers User's Manual*, Advanced Micro Devices, ©1997, pp. 3–1 through 3–3, 6–1 through 6–12.
*Pentium®II Xeon™ Processor Datasheet*, Intel Corporation, ©1998, pp. 1–2, 7–13, 38–41 and 88.
*Intel Architecture Software Developer's Manual*, Intel Corporation, ©1997, pp. 9–1 through 9–17 and 17–28 through 17–36.

* cited by examiner

Primary Examiner—Jeffrey Gaffin
Assistant Examiner—Rehana Perveen
(74) Attorney, Agent, or Firm—Akin Gump Strauss Hauer & Feld LLP

(57) ABSTRACT

A processor-based system provides communication among multiple computer devices operating at different frequencies utilizing clock synchronization. Phase relationship is maintained between clock signals running a different frequencies such that a read cycle of a device operated at the faster frequency is initiated when the clock signals are in phase. A write cycle of the faster frequency device is initiated when the clock signals are out of phase. A synchronization signal is generated by sampling the clock signals together to indicate the phase relationship. In addition, a return clock, derived from the faster clock, drives external devices. Information sent from internal devices to external devices are passed through a register driven by the return clock. Timing delays for information presented to the external devices is avoided as the register transmits all information according to the return clock. Return data is clocked into a return register also according to the return clock. The return register presents the return data at the next read cycle according to the slower clock signal.

27 Claims, 9 Drawing Sheets

SYNCHRONIZING DATA BETWEEN DIFFERING CLOCK DOMAINS

BACKGROUND OF THE INVENTION

1. Field of the Invention

The present invention relates to communication among computer devices and more particularly to communication between computer devices operating at different clock frequencies and having skewed clock signals.

2. Description of the Related Art

Today's computer systems have been required to operate at ever increasing clock frequencies. One limiting factor to these faster performance levels has been the accuracy of the clock signals. Undesirable variation from ideal clock accuracy or skew was sought to be minimized. Today's clock generators have been required to deliver the shortest possible rise/fall times in propagation delay, tighter skew specifications and minimum jitter. As system cycle times decreased with higher performance systems, any slight variations even in terms of picoseconds ($10^{-12}$ sec) of integrated circuit outputs, or skew, become a more significant percentage of the overall timing budget. A particular area in the computer system where this has been very critical is the system clock.

The system clock must be distributed to various nodes across a board or backplane and yet exhibit little or no distortion. Thus, in addition to generating the various clock signals for the processor, or CPU, a clock generator must also provide other clock signals to peripheral interfaces such as video and graphics. Every picosecond of skew introduced into the clock line was propagated along the critical timing path.

The timing problems confronted in dealing with a single clocked system are compounded when multiple clock signals having different clock frequencies are introduced into the system. For example, a computer system is likely to have numerous independent processors each capable of being clocked at different frequencies. These differences in clock frequencies must be considered when defining timing requirements for communication between such computer devices. Typically, multiple frequency systems have been avoided where possible. However, in systems that require operation within at least two different frequency domains, the timing limitations caused by the differences in the frequency domains and the skew imposed on top of the clock signal have either directly limited the access speed for communication between devices operating at different frequencies or have been compensated by the introduction of multiple flip-flops to counteract the skew. Specifically, one mode of communication between devices operating at different frequencies has been achieved by quantitatively determining when the clock signals were expected to align. Because the different frequencies were known at the design stage, these timing calculations could be made ahead of time to form the proper system communications timing protocol. However, the required error timing ranges imposed on the read and write cycles to prevent setup and hold timing errors limited high speed applications. Alternatively, timing errors have been reduced through the use of multiple flip-flops to modify the timing of a transmitted signal by delaying a signal transmitted from one frequency domain gradually into the frequency domain of the recipient device. Likewise, however, the delay associated with the introduction of multiple flip-flop devices served as a performance limitation.

SUMMARY OF THE INVENTION

Briefly, a computer system is adapted to communicate between computer devices operating at different clock frequencies and to compensate for clock delay between computer devices operating at the same frequency. The computer system includes a transmission bus providing interconnection among multiple peripheral devices. A synchronization signal is generated that indicates the phase between the different clock frequencies. Setup/hold timer issues are avoided by sampling signals transmitted from a device driven by a slower clock when the different clock signals are in phase. Similar setup/hold timing issues are avoided for signals transmitted from a device driven by the faster clock signal by sampling the received signals when the different clock signals are diametrically out of phase.

Further, the system compensates for clock skews up to almost a full clock cycle by providing a register that is clocked by a delayed clock signal. In this manner, a transmitted signal is received by the register in the normal clock frequency domain and released by the register in the delayed clock frequency domain and then received by the receiving device which is also clocked at the delayed clock frequency. Finally, return communications from the computer device operated at the delayed clock frequency to the computer device operated at the slower clock frequency is provided by a return register that is clocked at the delayed clock frequency. The return register releases return data during the next read cycle of the computer device operated at the slower clock frequency.

BRIEF DESCRIPTION OF THE DRAWINGS

A better understanding of the present invention can be obtained when the following detailed description of the preferred embodiment is considered in conjunction with the following drawings, in which:

FIG. 3b is a timing diagram illustrating an exemplary timing relationship of the clock signals of FIG. 3a;

DETAILED DESCRIPTION OF PREFERRED EMBODIMENT

A patent application describes a clock driver device and some particular features of that device in a commonly assigned U.S. patent application Ser. No. A99113US, entitled "FLEXIBLE MICROCONTROLLER ARCHITECTURE" TO James R. Magro, filed on Aug. 23, 1999, which is hereby incorporated by reference as if set forth in its entirety.

Microcontroller

Figure 1:
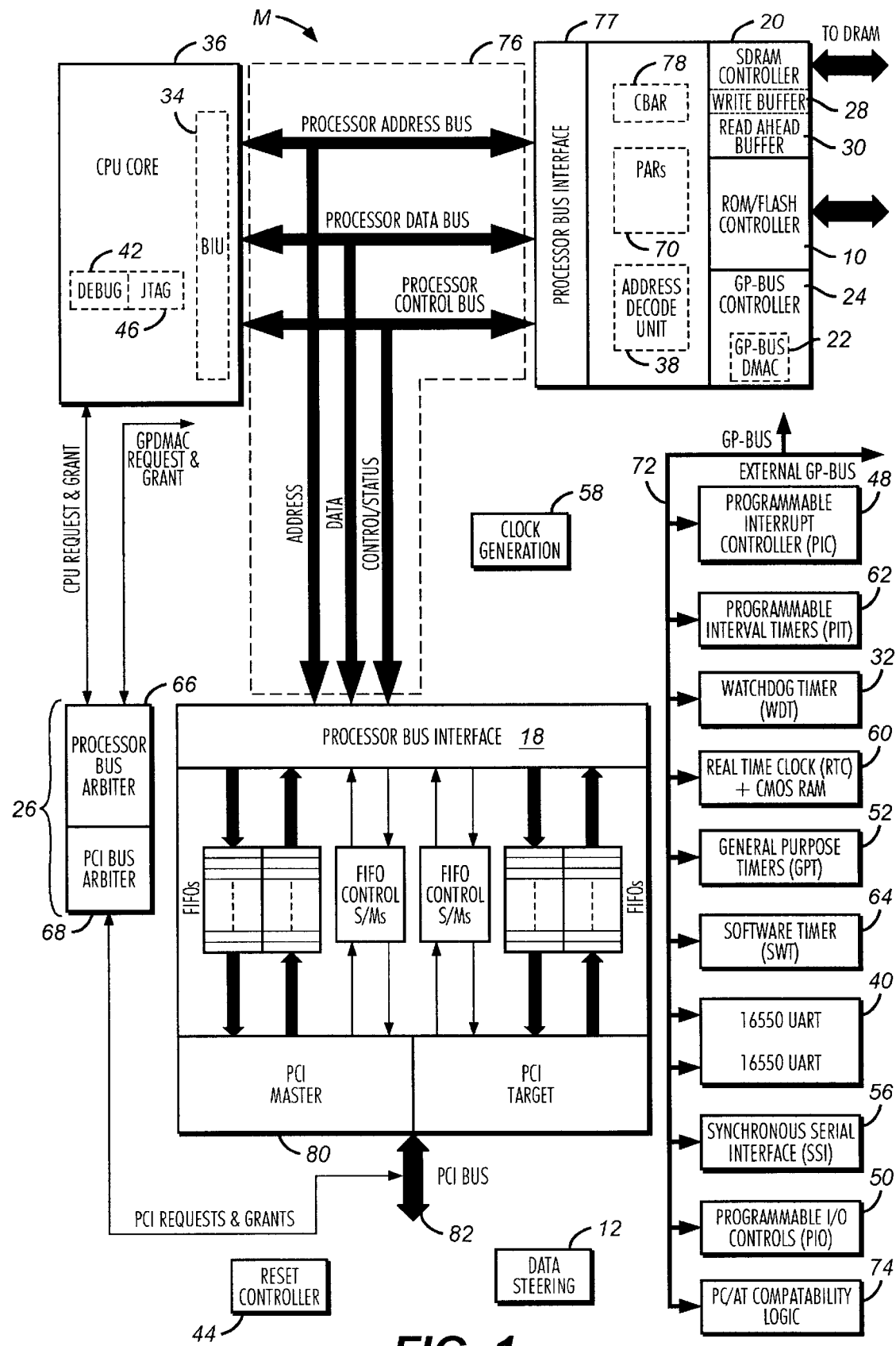
FIG. 1 is a block diagram of an exemplary microcontroller.

Turning now to the drawings, FIG. 1 shows a typical microcontroller M in accordance with the present invention. The microcontroller M provides a highly integrated CPU 36 with a complete set of peripherals that are superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability, write protection, and code execution control for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a synchronous dynamic random access memory (SDRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36. The memory space and I/O space of the PCI bus 82 are accessible by the CPU 36, the PCI master controller 80, and external PCI bus masters.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMAC 22 and the PCI host bridge 18 on behalf of an external PCI master connected to the PCI bus 82. The PCI bus arbiter 68 may arbitrate between five possible PCI masters.

A processor bus interface, BIU 34, is responsible for DMA cache snooping, dynamic clock speed adjusting, dynamic bus sizing, ready signal consolidation. Memory Mapped Configuration Region (MMCR) control, and general purpose address control is performed by ADU 38. A bus interface unit, or BIU, 34 basically assists the CPU 36 with bus, DMA, and memory control.

A clocks module 58 provides oscillators and phase locked loops (PLLs) to support the SDRAM controller 20, UARTs 40, general purpose timers (GPT) 52, and a real-time clock (RTC) 60.

The SDRAM controller 20 provides SDRAM (synchronous SDRAM) support, symmetric and asymmetrical SDRAM support, SDRAM auto refresh support, SDRAM Error Correction Code (ECC) support, SDRAM write buffering support, SDRAM read pre-fetching support, read-around-write support, and support for up to 256 megabytes of SDRAM. The SDRAM controller 20 may service requests from the CPU 36, the PCI host bridge 18 on behalf of a PCI master, or the general purpose bus DMA controller and may issue commands to SDRAM devices. SDRAM cycles may be also be initiated by a write buffer 28 or a read-ahead buffer 30 internal to the SDRAM controller 20. The write buffer 28 and the read-ahead buffer 62 together provide buffering techniques to optimize SDRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and SDRAM. Features of the controller 22 includes support for up to 7 DMA request channels (with a maximum of 4 external requests), support for three 16-bit channels and four 8-bit channels, buffer chaining capability in enhanced mode, fly-by transfers between general purpose bus peripherals and SDRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (ICE) core 42 provides an integrated debug interface for embedded hardware/software debug during a special debug mode, ICE mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller SDRAM space. The PCI Host bridge 18 may be a 33 MHz, 32-bit PCI Bus Revision 2.2 compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode.

The PIC 48 includes a router that may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 10 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient fall-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33 MHz CPU clock.

The PC/AT compatibility logic 74 provides PC/AT-compatible functions. The PC/AT compatible integrated peripherals include the DMA controller 22, the PIT 62, the PIC 48, the GPT 52, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Clock Synchronization

Figure 2A:
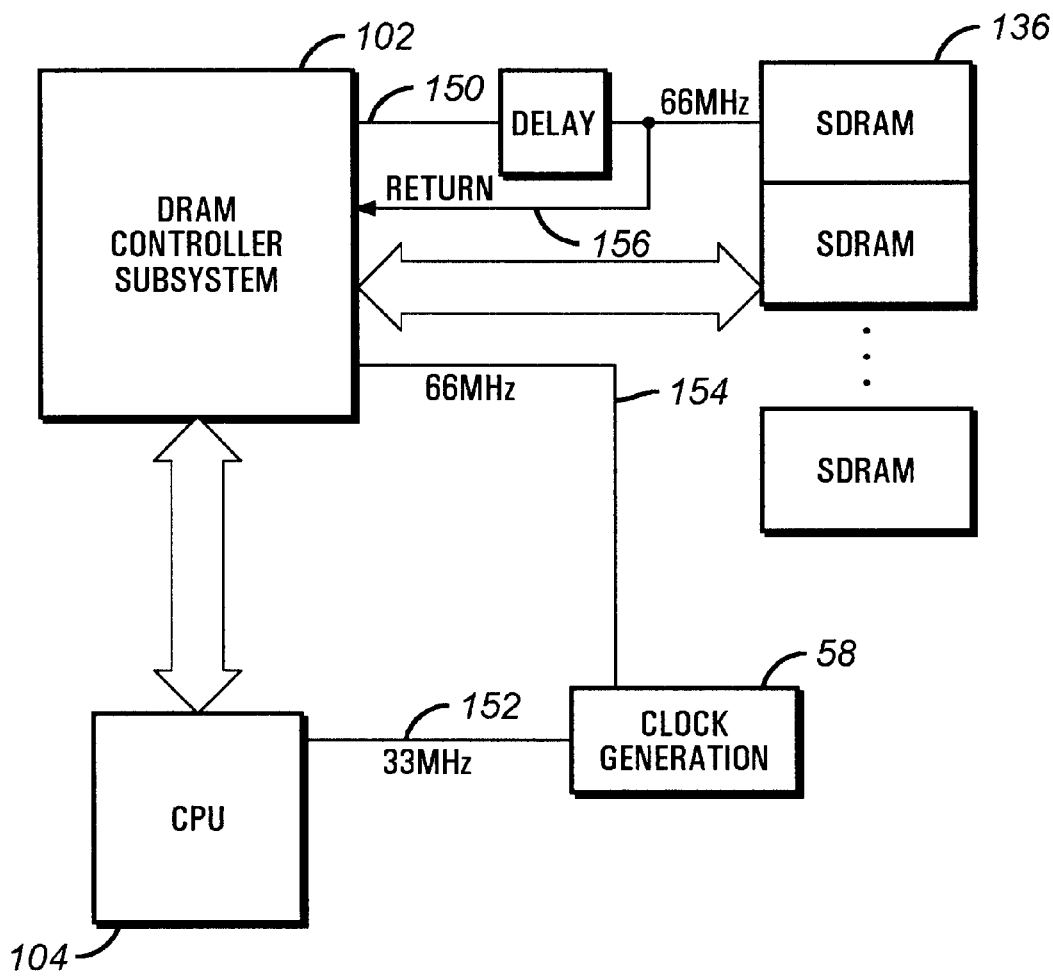
FIGS. 2a and 2b are detailed block diagrams illustrating an exemplary clock synchronization scheme for the SDRAM controller of FIG. 1.
Figure 3A:
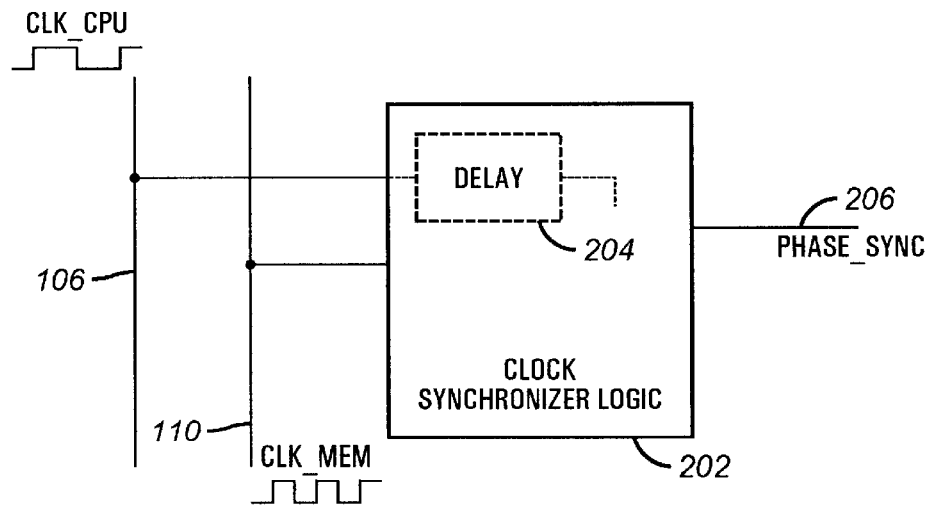
FIG. 3a is a block diagram of exemplary clock synchronizer logic of the SDRAM controller subsystem of FIGS. 2a and 2b.
Figure 3B:
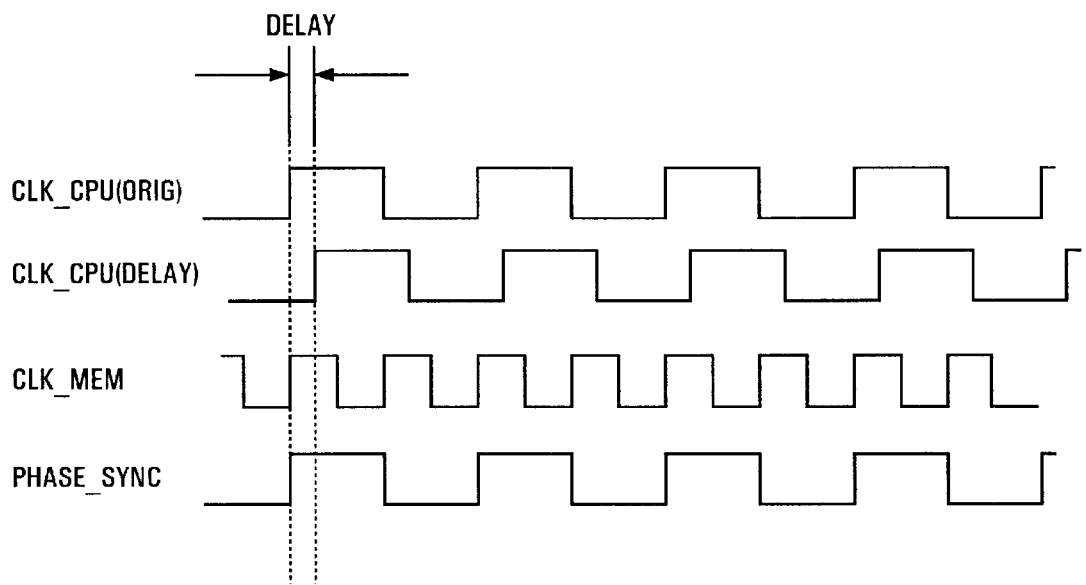

Turning now to FIG. 2a, a high level block diagram is shown that illustrates the communication between the SDRAM memory devices 136, the system master devices, including the CPU 104, the PCI host bridge 18 and the GP-BUS DMA 22, and a SDRAM controller subsystem 102 including the SDRAM controller 20 (FIG. 1). Specifically, FIG. 2a illustrates the clocking differences between the identified devices. In the illustrated embodiment, the SDRAM controller subsystem 102 runs at a frequency twice that of any of the other internal masters, including the CPU 104. According to an embodiment, all of the master devices, including the CPU 104, the PCI host bridge 18 (on behalf of a PCI master connected to the PCI bus 82) and the GP bus DMA Controller 22 (FIG. 1) operate at 33 MHz, driven by the 33 MHz clock signal 152, while the SDRAM controller 20 operates at 66 MHz, driven by the 66 MHz clock signal 154. Because signaling is passed back and forth between the CPU 104, operating at 33 MHz, and the SDRAM controller subsystem 102, operating at 66 MHz, certain clocking conditions are maintained between the 33 MHz clock source and the 66 MHz clock source. These conditions are described in connection with FIGS. 3–5.

In addition, the SDRAM controller subsystem 102 supplies or sources a SDRAM clock signal 150 to run the SDRAM devices 136. The SRAM devices 136 are generally located external to the microcontroller M and may be located off of the circuit board (not shown) housing the microcontroller M. The SDRAM clock signal from the SDRAM controller subsystem 102 may either be provided to the SDRAM devices 136 directly, if the clock signal is not severely loaded, or through an external clock driver that distributes the SDRAM clock signal. Because of delays associated with either a loaded clock source, chip PAD delays or an external driver, a "return" clock 156 is provided back to the SDRAM controller subsystem 102. The SDRAM controller subsystem 102 uses this return clock 156 to compensate for the external clock delays in latching read (returned) data from the SDRAM devices 136 during read cycles of the CPU 104, the PCI host bridge 18 (on behalf of a PCI master connected to the PCI bus 82) or the GP-BUS DMA 22. The return clock 156 also serves to synchronize signals sent from the SDRAM controller 20 to the SDRAM devices 136 in order to reduce the possibility of hold timing issues. Utilization of the return clock is described in more detail in connection with FIGS. 6–7.

Although the clock synchronization or timing protocol is described for communication between the CPU 104 and memory for illustrative purposes, it should be understood that the advances disclosed herein are applicable to communication timing among devices having varied functions and operating at different frequencies or in different frequency domains. It should be understood that a variety of internal or external devices (some of which are shown in FIG. 1) can transmit (or write) and receive (or read) information to or from a CPU or master.

Figure 2B:
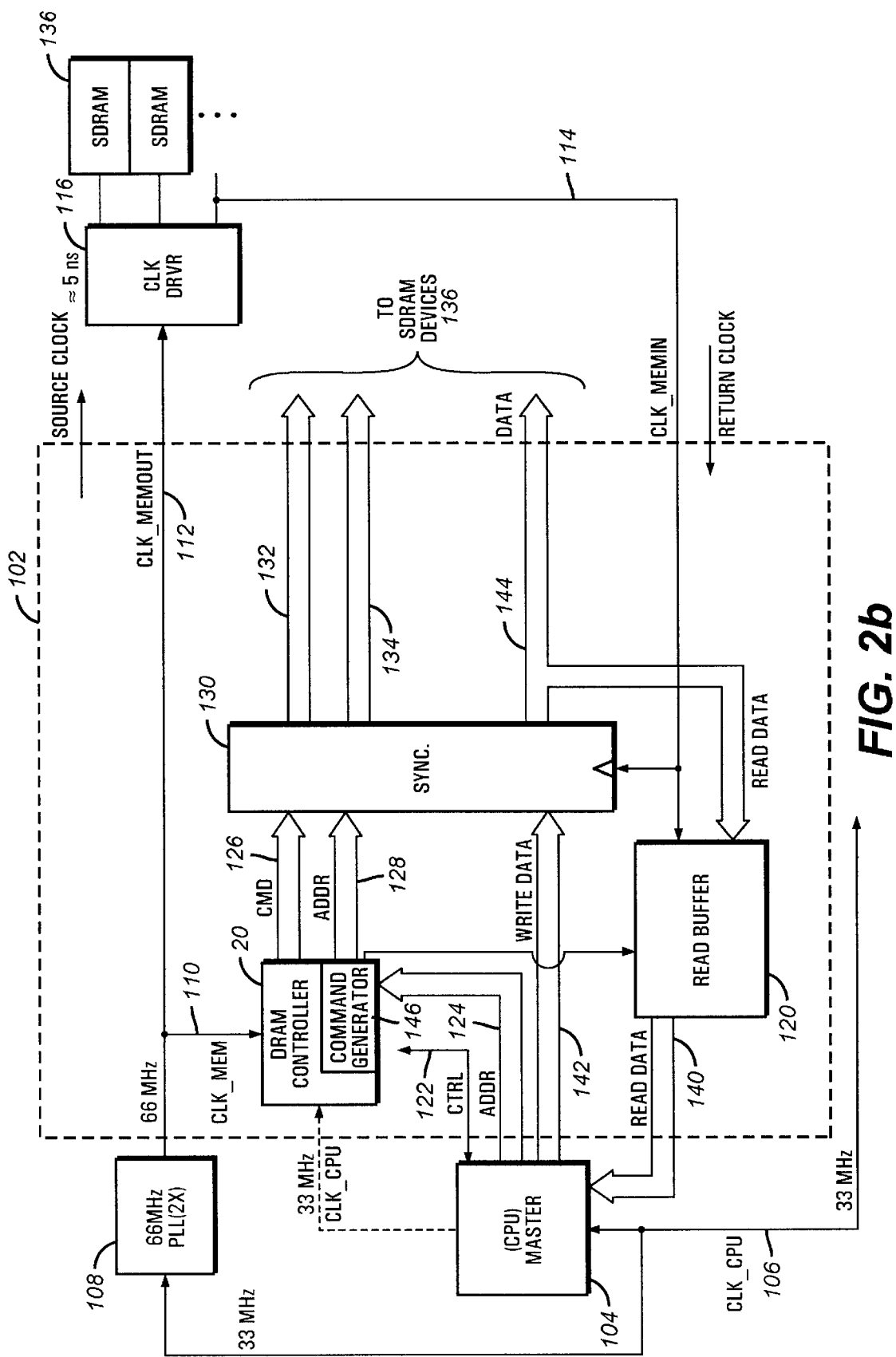

Turning now to FIG. 2b, shown is a more detailed exemplary illustration of the SDRAM controller subsystem 102. Specifically, the SDRAM controller 20, driven by a 66 MHz clk_mem clock signal 110, communicates between the SDRAM devices 136, which are driven by a skewed 66 MHz clk_memin clock signal 114, and the CPU or master 36, which is driven by a 33 MHz clk_cpu clock signal 106. According to an embodiment, communication occurs between the SDRAM controller 20 and the CPU 104 according to a timing protocol described in detail in connection with FIGS. 3–5. Control signals are transmitted between the SDRAM controller 20 and the CPU 104 over a CTRL signal line 122. Addressing information is sent over an address bus (ADDR)124. By maintaining a substantially strict clock phase relationship between the clk_cpu clock signal 106 and the clk_mem clock signal 110, communication is achieved between the SDRAM controller 20, operating in a 66 MHz clock frequency domain, and the CPU 104 operating in a 33 MHz clock frequency domain.

Communication between the SDRAM controller 20 and the SDRAM devices 136 is provided using a register 130 within the SDRAM controller subsystem 102. The register 130 compensates for the various delays between the clock frequency domain of the SDRAM controller 20 and the clock frequency domain of the SDRAM devices 136. Specifically the clk_memin clock signal 114, or return clock signal, sourced from the SDRAM controller 20 and which drives the SDRAM devices 136, is a skewed version of the 66 MHz clk_mem clock signal 110. The clk_memin clock signal 114 is delayed due to loading from the circuit board layout, and due to an external clock driver 116, if used. The "FLEXIBLE MICROCONTROLLER ARCHITECTURE" patent application, which is incorporated into this document, describes a particular clock driver in detail. Continuing, the clk_memin clock signal 114 is provided as a return clock signal to drive the register 130 in the same clock frequency domain as the SDRAM devices 136. This ensures that data and other information is released according to the clk_memin clock signal 114 thereby preventing timing problems when the data is presented to the SDRAM devices 136.

Command and address information is sent by the SDRAM controller 20 over the command bus (CMD) 126 and the address bus (ADDR) 128, respectively, in the 66 MHz clk_mem clock frequency domain. The command and address information is received by the register 130. Since the register 130 is clocked by the clk_memin clock signal 114, the command and address information is released in the same clock frequency domain within which the SDRAM devices 136 operate. Specifically, the outgoing command and address information is transmitted over the command bus 132 and the address bus 134 respectively upon a next rising edge of the clk_memin clock signal 114, not the clk_mem clock signal 110. The SDRAM devices 136, therefore, receive command and address information in the clk_memin frequency domain, which is a skewed version of the 66 MHz clk_mem frequency domain seen by the SDRAM controller subsystem 102.

Write data from the CPU 104 received by the SDRAM devices 136 is processed in a similar manner. Specifically, data is written to the data bus 142 by the CPU 104 in the clk_cpu clock frequency domain. The write data is received by the register 130 where the data is released onto the data bus 144 upon a next rising edge of the clk_memin clock signal 114. Thus, the SDRAM devices 136 receive the data from the CPU 104 in the clk_memin frequency domain.

Finally, the CPU 104 reads data from the SDRAM devices 136 via a read buffer or latch 120 within the SDRAM controller subsystem 102. Essentially, data from the SDRAM devices 136 is transmitted into the read latch 120 in the clk_memin frequency domain (i.e., relative to the clk_memin clock signal 114). The read latch 120 holds the received data until the CPU 104 can read the data at the next CPU read cycle. The CPU 104 reads the data from the read latch 120 upon its next read cycle according to the clk_cpu clock signal 106. A command generator 146, within the SDRAM controller 20, generates a data-start signal off of the clk_mem clock signal 110 that is sampled by the read latch 120 within the clk_memin frequency domain. The data_start signal tells the read latch 120 that a read command is issued. The read latch 120 then determines when to capture the data from the SDRAM devices 136 within the clk_memin frequency domain. Thus, the data transmitted from the SDRAM devices 136 in the clk_memin frequency domain, is held by the read latch 120 and is subsequently read by the CPU 104 in the 33 MHz clk_cpu frequency domain.

FIGS. 3–6 illustrate in more detail the communication timing protocol for communications between the CPU 104 and the SDRAM controller 20. A phase_sync signal 206 is generated by clock synchronizer logic 202 within the SDRAM controller subsystem 102. Specifically, the clock synchronizer logic 202 generates the phase_sync signal 206 to identify the correct clk_mem clock signal 110 edge on which to launch or assert a signal the correct edge to sample a signal from the bus. Turning to FIG. 3a, the clock synchronizer logic 202 receives as input the 33 MHz clk_cpu clock signal 106 and the 66 MHz the clk_mem clock signal 110. The phase relationship between the two clocks is determined by first delaying the clk_cpu clock signal 106 with respect to the clk_mem clock signal 110 through a delay device 204. One skilled in the art will appreciate a number of ways of implementing the delay device 204. The clk_cpu clock signal 106 is then sampled along with the clk_mem clock signal 110. As shown in FIG. 3b, the delay will be substantial enough to maintain the clk_cpu clock signal 106 as lagging the clk_mem clock signal 110 throughout minimum and maximum timings. In other words, the rising edge of the clk_cpu (delay) signal will lag the corresponding rising edge of the clk_mem signal 110. The phase_sync signal 206 is then generated from the delayed clk_cpu (delay) clock signal and the clk_mem clock signal 110. Specifically, the phase_sync signal 206 is asserted in response to the rising edge of the clk_mem clock signal 110 when the clk_mem clock signal 110 and the clk_cpu clock signal 106 are in phase. Both clocks will be in phase upon any clk_mem clock signal 110 rising edge that the clk_cpu (delay) clock signal is sampled low. The phase_sync signal 206 is then driven active. The phase_sync signal 206 will be held asserted until the following rising edge of the clk_mem clock signal 110.

Figure 4:
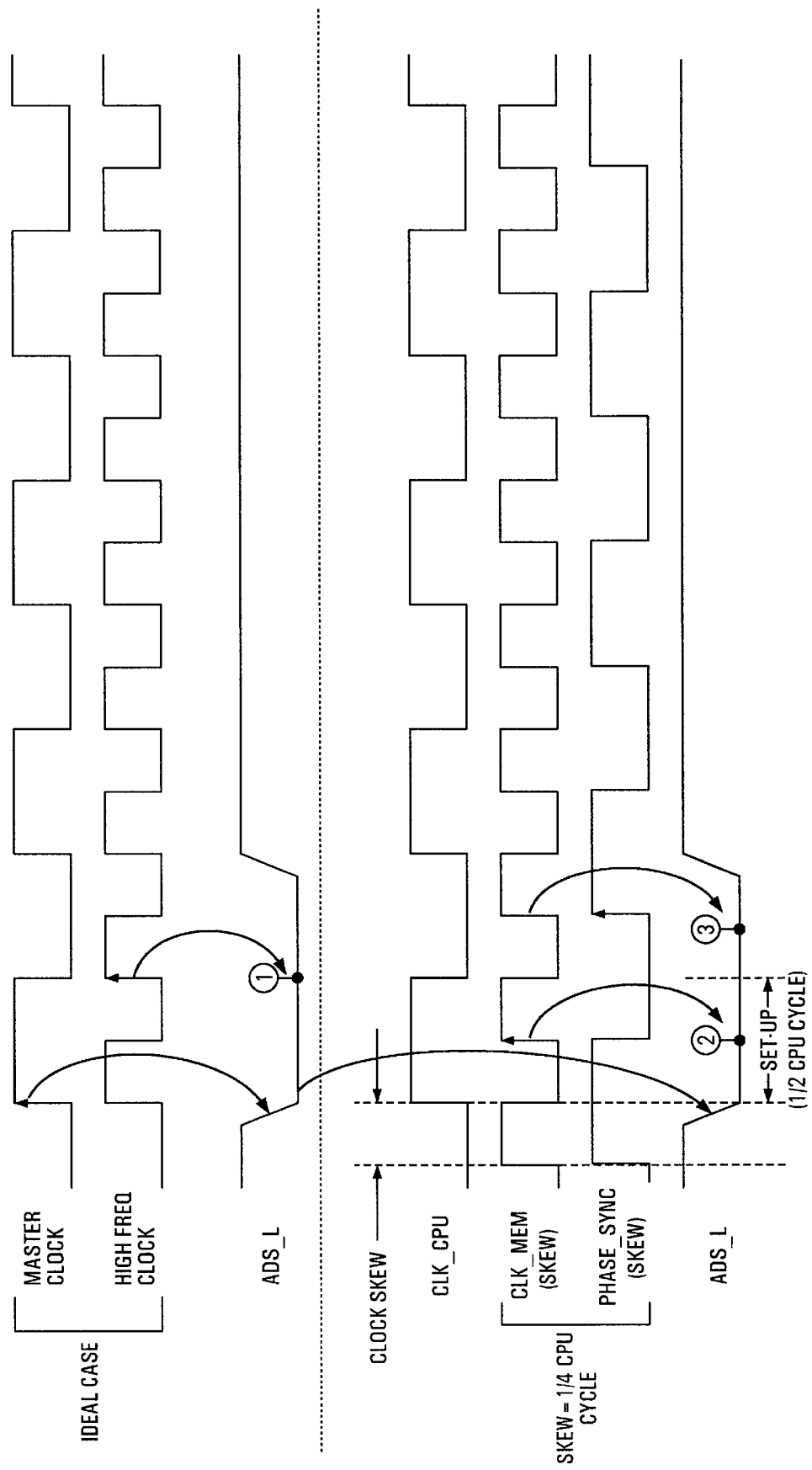
FIG. 4 is a timing diagram for exemplary signals transmitted from the CPU of FIG. 1 to the SDRAM controller of FIG. 1.

As described, for information signals communicated between devices clocked off or based on the clk_mem clock signal 110 and devices clocked off or based on the clk_cpu clock signal 106, it is helpful to identify the relevant edges of the clk_mem clock signal 110 on which to send or receive the information signals, depending on the direction of the communication. FIG. 4 illustrates the timing protocol for communications originating from the CPU or master 104 and received by the SDRAM controller 20. An ADS_L signal, shown for illustrative purposes, is a signal sent from the CPU 104 that informs the SDRAM controller 20 when an address ready is present on the address bus 124. The phase_sync signal 206 is used to ensure that the SDRAM controller 20 samples the CPU signals, including the ADS_L signal, at an appropriate time. Since the SDRAM controller 20 operates off of the clk_mem clock signal 110, running twice the frequency of the clk_cpu clock signal 106, the SDRAM controller 20 would normally read all signals at the first rising edge of the clk_mem clock signal 110 that occurs after a command has been written. For example, normally after an ADS_L signal is initiated, without the benefit of the timing scheme disclosed herein, a communicating controller would sample the ADS_L signal according to its own higher frequency clock signal at time ① of FIG. 4. In the ideal case shown by the top set of signals, such a read occurs approximately at the mid point of the ADS_L signal.

However, under real-world operating conditions, the clk_mem clock signal 110 will be skewed in comparison to the clk_cpu clock signal 106. The skew may occur from any number of sources including delay resulting from the phase-lock-loop 108 (FIG. 2b) which generates the clk_mem clock signal 110 from the clk_cpu clock signal 106. For example a clock driven without a phase lock loop can have delays up to 6 nanoseconds (ns). A clock driver with a phase lock loop can have less delay than a clock driver without a phase lock loop, 1 nanosecond to 2 nanoseconds for example. Delay may also occur from other sources such as board design layout. With up to 6 nanoseconds of delay it is not uncommon for skew to exist that is nearly one quarter the period of a processor clock cycle.

The bottom set of signals shown in FIG. 4 illustrate the timing for a non-ideal system where the clk_mem clock signal 110 is skewed compared to the clk_cpu clock signal 106. Thus, when the higher frequency clock signal is skewed, a communicating controller would normally (without the benefit of the disclosed timing scheme) sample the ADS_L signal at the first rising edge of the skewed higher frequency clock signal after the ADS_L had been issued, at time ②. However, sampling at time ② of FIG. 4 is too early because the addressing information from the issuing CPU is not set up at time ②. Using ADS_L as an example, an address from an issuing CPU is driven off the master clock signal at the same time that ADS_L is driven low. By the time that the address is decoded, it could take on the order of 20 nanoseconds to decode and generate the address. By sampling at time ① in the ideal case, and even worse at time ② in the non-ideal case, the address timing is likely violated.

According to an embodiment, the phase_sync signal 206 is used to inform the SDRAM controller 20 to wait to read a signal originated from a device driven of the slower clock until the clk_cpu clock signal 106 and the clk_mem clock signal 110 are in phase. Because the phase_sync signal 206 is generated within the SDRAM controller 20, in the clk_mem frequency domain, the phase_sync signal 206 will exhibit the same skew as the clk_mem clock signal 110. The phase_sync signal 206 instructs the SDRAM controller 20 to sample at time ③ instead of at time ②. Sampling ADS_L at time ③ when phase_sync is low essentially guarantees that the address is stable by providing the proper set up and hold time to the device being clocked off the clk_cpu clock signal 106. For a 33 MHz 486 packaged part, a typical setup/hold timing requirement for the ADS_L signal is 3 ns at a minimum and 16 ns at a maximum. For the BRDY_L signal, where the SDRAM controller 20 returns BRDY_L from the fast clock, clk_mem, to the slow clock, clk_cpu, the typical setup/hold timing requirement is 5 ns setup and 3 ns hold. According to an embodiment, the processor and the SDRAM controller are embedded on the same silicon. Typical setup/hold timing requirements for such an embedded configuration is much lower.

Figure 5:
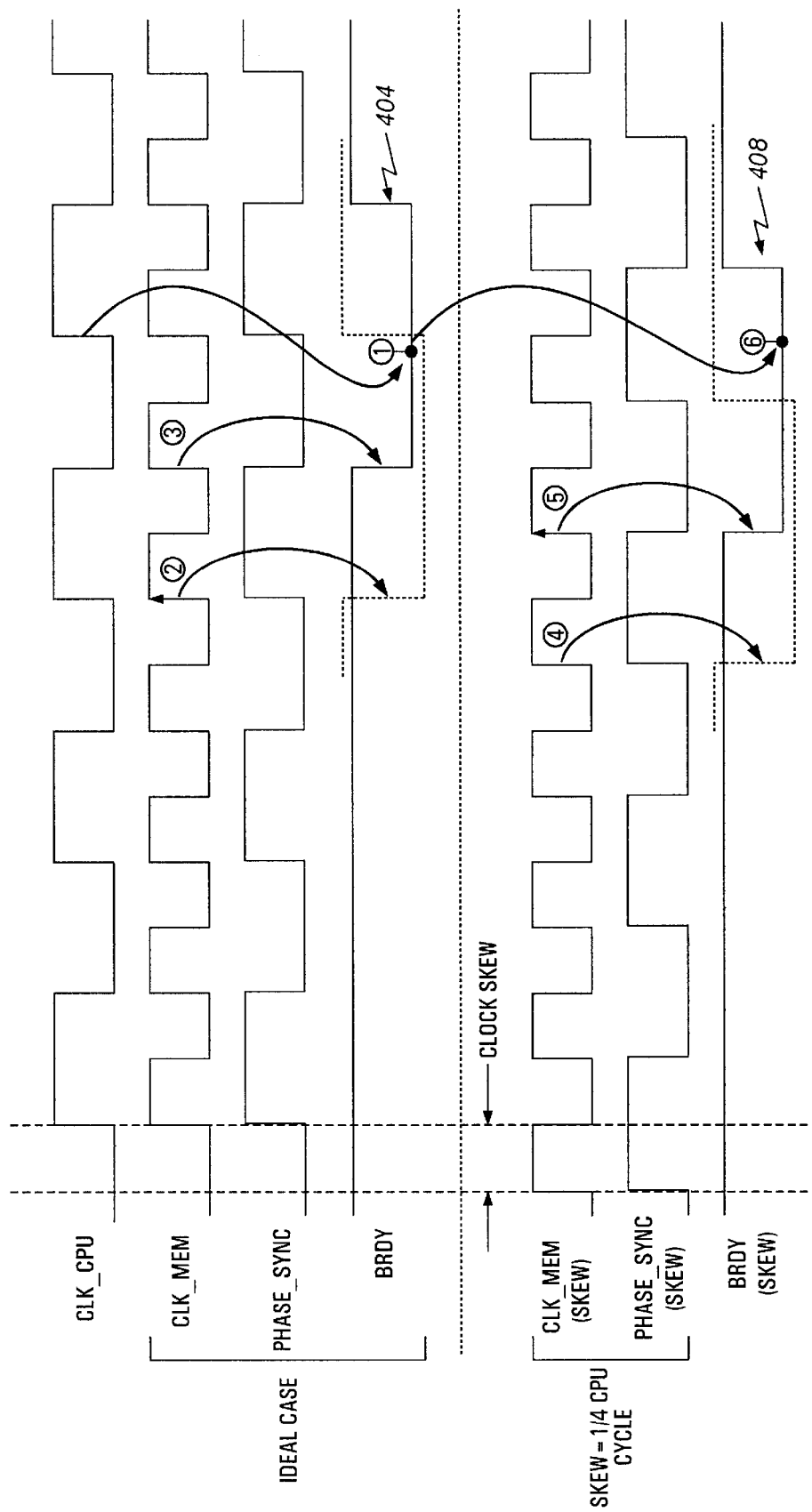
FIG. 5 is a timing diagram for exemplary signals transmitted from the SDRAM controller of FIG. 1 to the CPU of FIG. 1.

FIG. 5 illustrates the timing considerations for signals originating from the SDRAM controller 20 and received by the CPU 104. Normally, without benefit of the disclosed timing scheme, a communicating controller would send control signals on the rising edges of the higher frequency clock signal. However, this creates a hold time violation because the master reads the signal according to its slower clock signal. According to an embodiment, the phase_sync signal 206 is used to ensure that the SDRAM controller 20 sends its signals at an appropriate time such that the CPU 104 will not miss the signals. The top set of signals shown in FIG. 5, illustrate utilization of the phase_sync signal 206 in the ideal case while the bottom set of signals illustrate utilization of the phase_sync signal 206 in the non-ideal case.

Since the SDRAM controller 20 operates based on the clk_mem clock signal 110 which is twice the frequency of the clk_cpu clock signal 106, a controller similar to the SDRAM controller 20 would normally, without the benefit of disclosed timing scheme, send all signals on the first rising edge of the higher frequency clock signal that occurs after the event triggering the outgoing signal. The BRDY signal, shown for illustrative purposes, is a signal sent from the SDRAM controller 20 that informs the CPU 104 that the SDRAM controller 20 is ready for another read or write access. Therefore, in the ideal case, normally without the benefit of disclosed timing scheme, a controller similar to the SDRAM controller 20 would send a BRDY signal, indicated by phantom line, at the rising edge of the higher frequency clock signal indicated at time ② of FIG. 5. The corresponding master would then sample the BRDY signal at the next rising edge of the master clock signal indicated at time ①. In the ideal case, such timing may be sufficient to provide the master with a reliable read of the BRDY signal. However, if there is any substantial clock skew, as shown by the bottom set of signals in FIG. 5, it is likely that the master will entirely miss the BRDY signal. In a real-world system, a BRDY (skew) signal, indicated by phantom line, would normally, without the benefit of the disclosed timing scheme, be issued by a controller similar to the SDRAM controller 20 at the rising edge of the skewed higher frequency clock signal indicated at time ④. Because of the skew of the higher frequency clock signal, the BRDY (skew) signal would be sampled at the next rising edge of the master clock signal indicated at time ⑥. This sampling is too late because the BRDY (skew) signal, indicated by phantom line, would have already been de-asserted (i.e., goes high).

The phase_sync signal 206 instructs the SDRAM controller 20 to wait to transmit the BRDY signal until the clk_cpu clock signal 106 and the clk_mem clock signal 110 are 180° out of phase. Therefore, in the ideal case shown by the top set of signals, the BRDY signal 404 is generated off of the clk_mem clock signal 110 when the phase_sync signal 206 is sampled high at time ③. That signal is then sampled at the next rising edge of the clk_cpu signal 106 at time ①. Proper setup and hold timing is provided by sampling the BRDY signal at approximately the midpoint of the BRDY signal 404. Taking skew into account in the bottom set of signals, the BRDY (skew) signal 408, issued off of the clk_mem clock signal 110 when the phase_sync signal 206 is sampled high at time ⑤, is likewise sampled at time ⑥, well before the BRDY signal is deasserted (i.e., goes high).

Therefore, according to an embodiment, communication among computer devices driven at different clock frequencies is achieved by maintaining a substantially strict phase relationship between the different clock sources. Specifically, signals sent from a computer device operated at a slower frequency are sampled by a device operating at the faster frequency at a time when the different clock signals are in phase. In the reverse direction, signals are sent from a device operated at the faster frequency to the device operated at the slower frequency when the different clock signals are out of phase. In addition, a phase_sync signal is provided to identify the phase relationship between the two clock signals. In this way, repetitive sampling of the actual clock signals is avoided. It should be understood, that while the exemplary faster clock frequency, as discussed for exemplary purposes, is double that of the exemplary slower frequency, other multiples of the slower clock frequency may be accommodated with only minor timing adjustments.

Turning away from FIG. 5, the illustrative system also provides for communication among the SDRAM devices 136, the CPU 104 and SDRAM controller 20. According to an embodiment, the SDRAM controller 20 supplies a clock signal to drive the SDRAM memory devices 136. An external clock driver 116 (FIG. 2) may be provided to distribute the SDRAM clock signal to the multiple SDRAM devices. Alternatively, it may also be possible to supply the SDRAM clock signal directly to the SDRAM devices if the clock signal is not severely loaded. Because the SDRAM clock or the clk_mem clock signal 110 has a frequency of 66 MHz, the clock signal provided to the SDRAM devices 136 will also have a frequency of 66 MHz. However, the delays associated with either the loaded clock source or the external clock driver 116 cause the clock signal provided to the SDRAM devices 136 to be skewed in comparison to its clk_mem clock signal 110 source. These delays are addressed by employing a "return" clock, the clk_memin clock signal 114 (FIG. 2), provided back to the SDRAM controller 20. The clk_memin clock signal 114 is used to compensate for the external clock delays and avoid the use of multiple flip flops typically used for synchronization of clock signals and the accompanying delays. As seen from FIG. 2, the clk_memin clock signal 114 is provided as the "return" clock signal to drive both the register 130 and the read latch 120. As discussed in detail with reference to FIGS. 6 and 7, use of the clk_memin clock signal 114 as a return clock reduces the possibility of hold timing issues at the SDRAM devices 136 due to the external clock delays introduced, for example, by the external clock driver.

Figure 6:
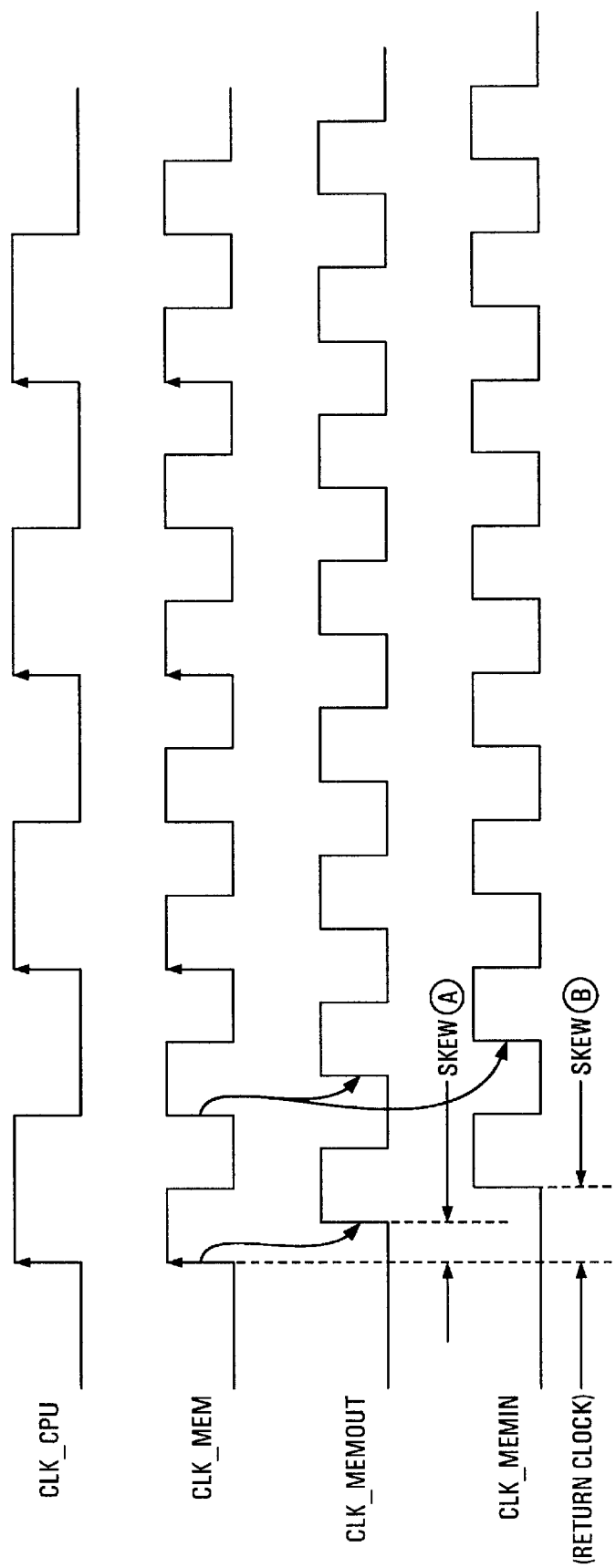
FIG. 6 is a timing diagram illustrating an exemplary relationship between various clock signals, including the return clock in accordance with the clock synchronization scheme of FIG. 2b.

FIG. 6 illustrates the relationship between the various clock signals including the return clock, the clk_memin clock signal 114. As shown, the clk_memin clock signal 114 operates in the clk_mem frequency domain but having a total skew propagated from both the skew contained in the clk_mem clock signal 110, the skew from the clk_memout clock signal (FIG. 2) due to design layout delays, chip PAD delays and external capacitive loading, skew A, and the skew introduced by the external clock driver 116, if used, skew B. The external delays from the clk_mem clock signal 110 to the clk_memin clock signal 114, for example, can be as large as almost a full clock cycle.

Read data from the SDRAM devices 136 is returned relative to the return clock, the clk_memin clock signal 114 (after delays), and must be captured in the CPU or master's clock frequency domain (clk_cpu). As such, as discussed above in reference to the phase_sync signal 202, a substantially strict clock phase relationship must be maintained between the 33 MHz clk_cpu clock signal 106 and the 66 MHz the clk_mem clock signal 110 in addition to accounting for delays within the return clock, the clk_memin clock signal 114. A substantially strict clock phase relationship is a phase relationship such that when the clock signals are determined to be in phase, setup and hold timer issues are avoided when the device operated at the faster frequency samples a control signal, for example, transmitted by the device operated at the slower frequency. Likewise, when the clock signals are determined to be approximately 180° out of phase, setup and hold timer issues are avoided when the device operated at the faster frequency writes information to be sampled or read by the device operated at the slower frequency.

Figure 7:
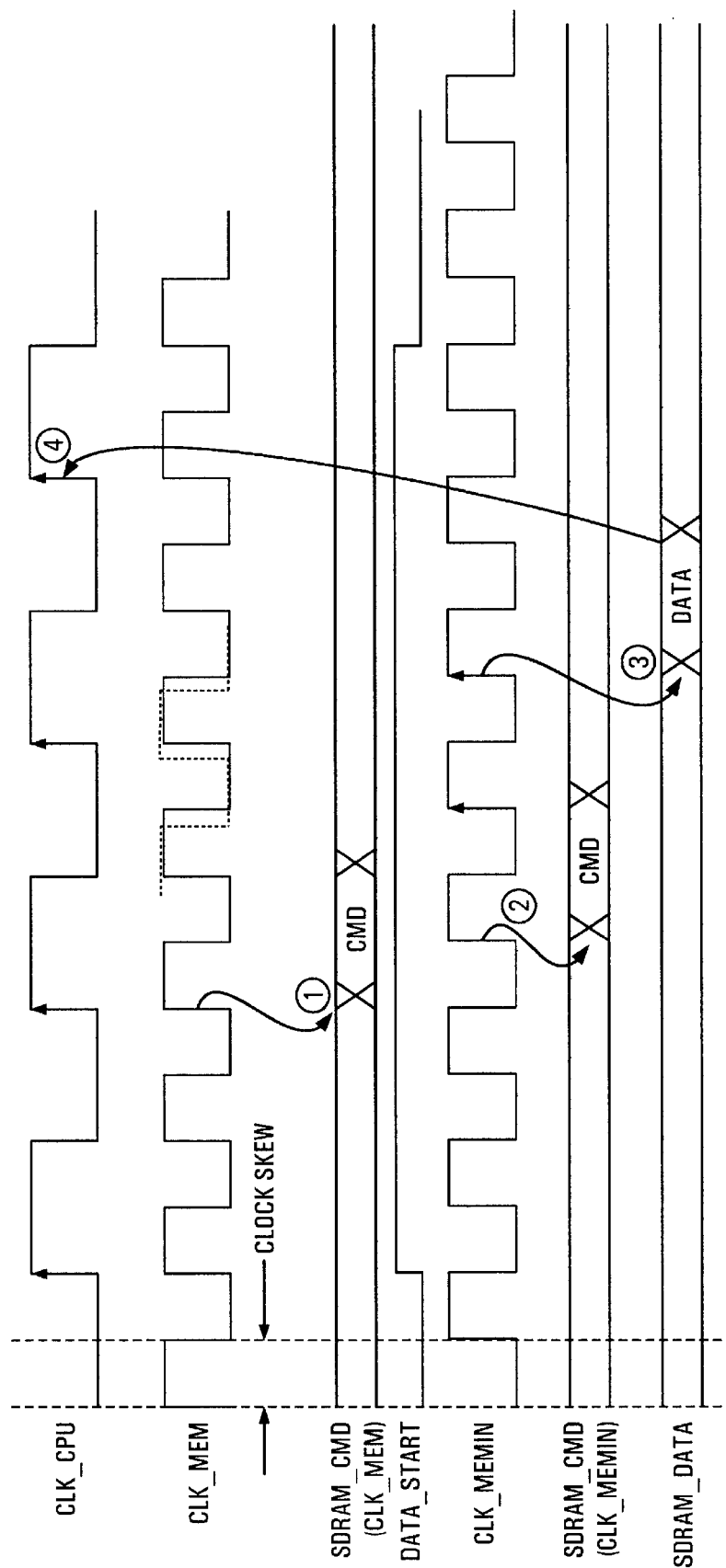
FIG. 7 is a timing diagram for exemplary signals transmitted to and from the SDRAM memory devices of FIGS. 2a and 2b.

Turning to FIG. 7, shown is a timing diagram for transmitting addressing and data information from the SDRAM controller 20 and the CPU 104 to and from the SDRAM devices 136. Specifically, command information, SDRAM_CMD, from the SDRAM controller 20 is sent in the clk_mem frequency domain, upon the rising edge of the clk_mem clock signal 110, at time ① of FIG. 7. The command information is received in the register 130 (FIG. 2). Because the register 130 is clocked by the clk_memin clock signal 114, or return clock, the command information is held until the next rising edge of the clk_memin clock signal 114. Upon the next rising edge of the clk_memin clock signal 114, the SDRAM_CMD is placed on the command bus 132 at time ①. In this way, the SDRAM_CMD signal is transmitted to the SDRAM devices 136 in the clk_memin clock signal 114 frequency domain. Timing issues resulting from the skew between the clk_mem clock signal clock 110 and the clk_memin clock signal 114 are resolved as the SDRAM devices 136 along with the register 130 are clocked in the same clk_memin frequency domain.

In the reverse direction, FIG. 7 also illustrates timing considerations for data returned from the SDRAM devices 136 to the SDRAM controller 20 and/or the CPU 104. Specifically, the SDRAM devices return data, SDRAM_DATA, in the clk_memin frequency domain at time ③ The command generator 146 (FIG. 2b) generates the data_start signal during read requests to inform the data latch 120 to start latching data. The data latch 120 will begin latching SDRAM_DATA in the clk_memin frequency domain. The read latch 120 can also be implemented as a FIFO SRAM. The SDRAM_DATA information is held by the read latch 120 and presented to the CPU 104 at the next rising edge of the clk_cpu clock signal 106, at time ④.

Figure 8:
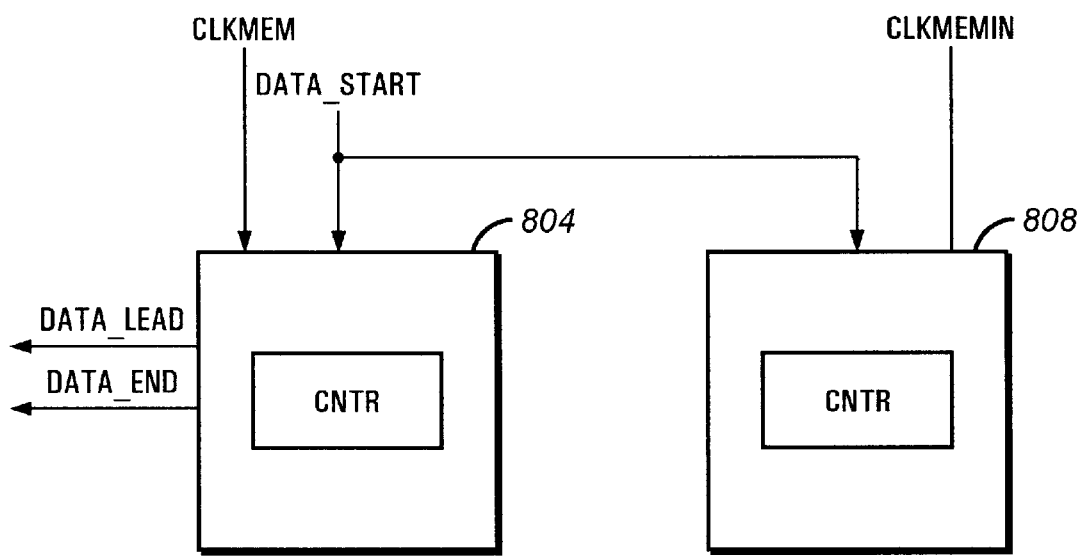
FIG. 8 is a block of a read cycle counter circuit of the SDRAM controller subsystem of FIGS. 2a and 2b.

FIG. 8 illustrates a circuit diagram to determine when the SDRAM_DATA read data in the clk_memin frequency domain has ended. As a result of the delays, a signal from the clk_memin frequency domain cannot be sampled with logic driven by the clk_mem clock signal 110. The data_end signal is generated in the clk_mem frequency domain to determine when a read is completed. Counter 804, running in the clk_mem frequency domain, and counter 808, running in the clk_memin frequency domain, both receive the data_start signal from the command generator 146 (FIG. 2b). The data_lead signal is generated in the clk_mem frequency domain to inform the SDRAM controller 20 when the first read data is expected. Each counter starts counting when it sees the data_start signal. The data_end signal is then generated to inform the SDRAM controller 20 when the last DWORD from the SDRAM devices 136 is available. The data-end signal is generated by the counter 804 when the counter 804 counts out without looking at a signal running in the clk_mem frequency domain. In this way, the SDRAM controller 20, running in the clk_mem frequency domain determines when read data is no longer available so that the read cycle may be completed.

Thus, communication is achieved among computer devices operating in different frequency domains. Specifically, communication between devices driven at different frequencies is achieved by maintaining a substantially strict phase relationship between differing clock signals. A receiving device operating at a relatively higher frequency samples a transmitted signal from a device operating at a relatively slower frequency when the differing clock signals are in phase. Information is sent in reverse direction when the differing clock signals are out of phase. In addition, generation of a synchronization signal to identify the phase relationship of the clock signals avoids having to repeatedly sample the clock signals directly. In addition, communication between devices operating at the same frequency but having one clock signal skewed from the other is achieved by providing a return clock from the delayed clock signal to drive a register. The return clock is used to compensate for the skew between the two same but time delayed clock frequency domains. Finally, communication is achieved between devices operating at different and skewed frequency domains by providing the same return clock to drive a hold data latch which holds and presents the return data within the slower clock frequency domain.

This particular microcontroller is illustrative. Although the described embodiment is directed to communication between SDRAM memory, a memory controller and a CPU, the disclosed timing scheme can be applied to a host of applications. Specifically, the techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

We claim:

1. A processor-based device adapted to communicate between multiple devices operating at different clock frequencies, the computer system comprising:
   a processor;
   a communications bus coupled to the processor;
   an internal device coupled to the communications bus to read information from the communications bus and to write information to the communications bus;
   a first clock signal for driving the internal device in a first clock frequency domain;
   an external device coupled to the communications bus to read information from the communications bus and to write information to the communications bus;
   a second clock signal for driving the external device in a second clock frequency domain, the second clock signal and the second clock frequency domain corresponding to a different frequency than the first clock signal and the first clock frequency domain; and
   a synchronization device coupled to the communications bus and driven by the second clock signal to synchronize information on the communications bus between the first clock frequency domain and the second clock frequency domain.

2. The processor-based device of claim 1, further comprising:
   a data latch device driven by the second clock signal and coupled to the communications bus to hold information for reads by the first computer device.

3. The processor-based device of claim 1, wherein the frequency of the second clock signal is twice the frequency of the first clock signal.

4. The processor-based device of claim 1, wherein the external device is a SDRAM memory device.

5. The processor-based device of claim 4, further comprising:
   a SDRAM controller coupled to the communications bus and driven by the second clock signal for communicating with the SDRAM memory device.

6. The processor-based device of claim 1, wherein the external device comprises a plurality of SDRAM memory devices.

7. The processor-based device of claim 6, the computer system including a SDRAM controller coupled to the communications bus and driven by the second clock signal, wherein a third clock signal provided to the plurality of SDRAM memory devices is skewed in comparison to the second clock provided to the SDRAM controller.

8. The processor-based device of claim 7, the computer system including a data latch device driven by the second clock signal, wherein the third clock signal drives the synchronization device and the data latch device.

9. The processor-based device of claim 1, the processor-based device further comprising:
   an oscillator device coupled to the internal device for generation of the first clock signal; and
   a phase lock loop device coupled to the oscillator and coupled to the external device for generating the second clock signal.

10. The processor-based device of claim 1, wherein a return clock signal is used to synchronize communications between the first clock frequency domain and the second clock frequency domain, the return clock being derived from the second clock signal.

11. The processor-based device of claim 10, wherein the return clock is the second clock signal.

12. The processor-based device of claim 1, further comprising:
    a plurality of clock drivers coupled to the internal device and coupled to the external device, the plurality of clock drivers receiving the first clock signal and generating the second clock signal.

13. The processor-based device of claim 1, wherein the internal device is located on-chip and the external device is located off-chip.

14. The processor-based device of claim 13, wherein a return clock is generated off-chip, the return clock being derived from the first clock signal.

15. A method of communicating between multiple computer devices, a first computer device operating in a first clock frequency domain and driven by a first clock signal and a second computer device operating in a second clock frequency domain and driven by a second clock signal, comprising the steps of:
    reading a first signal transmitted by the first computer device when the first clock signal is in phase with the second clock signal; and
    reading a second signal transmitted by the second computer device when the first clock signal is out of phase with the second clock signal.

16. The method of claim 15, further comprising the step of:
    generating a synchronization signal representing a phase relationship between the first clock signal and the second clock signal.

17. The method of claim 16, the generating step further comprising the steps of:
    asserting the synchronization signal when the first clock signal is in phase with the second clock signal; and
    deasserting the synchronization signal when the first clock signal is out of phase with the second clock signal.

18. The method of claim 17, wherein the step of reading the first signal is performed when the synchronization signal is asserted.

19. The method of claim 17, wherein the step of reading the second signal is performed when the synchronization signal is deasserted.

20. The method of claim 16, further comprising the step of:
    sampling the synchronization signal to determine when the first clock signal is in phase with the second clock signal and when the first clock signal is out of phase with the second clock signal.

21. A processor-based device adapted to communicate information over a computer bus between multiple computer devices operating a different clock frequencies, comprising:

a computer bus for transmitting information;

a first device coupled to the computer bus and driven by a first clock signal;

a second device coupled to the computer bus and driven by a second clock signal, the second device reading information from the computer bus transmitted by the first device when the first clock signal and the second clock signal are in phase and writing information to the computer bus when the first and second clock signals are out of phase.

22. The processor-based device of claim 21, further comprising :

a synchronization device coupled to the computer bus to generate a synchronization signal from the first clock signal and the second clock signal, the synchronization signal indicating the phase relationship between the first clock signal and the second clock signal.

23. The processor-based device of claim 21, wherein the information written to the computer bus when the clock signals are in phase is information transmitted from the first device, the first device operating at a slower frequency than the second device.

24. The processor-based device of claim 21, wherein the information written to the computer bus when the clock signals are out of phase is information transmitted from the second device, the second device operating at a faster frequency than the first device.

25. A processor-based device adapted to communicate between multiple devices operating at different clock frequencies, the computer system comprising:

a processor;

a communications bus coupled to the processor;

internal means coupled to the communications bus for reading information from the communications bus and for writing information to the communications bus;

a means for driving the internal device in a first clock frequency domain; external means coupled to the communications bus for reading information from the communications bus and for writing information to the communications bus;

a means for driving the external device in a second clock frequency domain, the second clock frequency domain corresponding to a different frequency than the first clock frequency domain; and means coupled to the communications bus for synchronization information communicated between the first clock frequency domain and the second clock frequency domain.

26. The processor-based device of claim 25, further comprising:

means coupled to the communications bus for holding information transmitted within the second clock frequency domain until a predetermined time within the first clock frequency domain.

27. A processor-based device adapted to communicate over a computer bus between multiple computer devices operating at different clock frequencies, comprising:

a computer bus for transmitting information;

a first device coupled to the computer bus and driven by a first clock signal; and a second device coupled to the computer bus and driven by a second clock signal;

means coupled to the computer bus for initiating a read cycle in the second device when the first clock signal and the second clock signal are in phase and initiating a write cycle in the second device when the first clock signal and the second clock signal are out of phase.

* * * * *